United States Patent [15] 3,640,479

Hata [45] Feb. 8, 1972

[54] CASSETTE TAPE DEVICE

[72] Inventor: Kiyoshi Hata, Kobe, Japan

[73] Assignee: Funai Electric Company, Limited, Osaka, Japan

[22] Filed: Oct. 26, 1970

[21] Appl. No.: 83,844

[30] Foreign Application Priority Data

Feb. 20, 1970 Japan ..................................45/14654

[52] U.S. Cl. ......................242/55.19 A, 179/6, 179/100.2 Z, 242/197

[51] Int. Cl. ..........................................................B65h 17/48

[58] Field of Search ................242/55.19 A, 55.19, 197, 198, 242/199, 200, 194; 352/128, 78; 179/100.2 Z, 6 R, 6 AC

[56] References Cited

UNITED STATES PATENTS

| | | | |
|---|---|---|---|
| 3,001,025 | 9/1961 | Gaubert | 242/55.19 A |
| 3,127,474 | 3/1964 | Waldman | 179/6 R |
| 3,376,390 | 4/1968 | Hashimoto | 179/6 AC UX |
| 3,410,470 | 11/1968 | Metzner | 242/55.19 A X |

*Primary Examiner*—Billy S. Taylor
*Attorney*—Eugene E. Geoffrey, Jr.

[57] ABSTRACT

A tape cassette for tape recorders embodying a reel to reel tape and an endless tape wherein the tapes may be driven simultaneously or individually.

1 Claims, 3 Drawing Figures

INVENTOR.
KIYOSHI HATA
BY Eugene E. Geoffrey Jr.
ATTORNEY

CASSETTE TAPE DEVICE

This invention relates to a cassette tape device and more specifically to a novel and improved cassette embodying upper and lower compartments with one compartment having an endless tape and tape reel and the other compartment having a pair of reels with a conventional tape. Both tapes are driven by a single set of driving means, and the cassette is particularly useful in automatic telephone responding and recording systems.

Automatic telephone responding and recording systems must reproduce a message previously recorded for transmission to the calling party and at the same time must record a message from the calling party for further reproduction. The major portion of the automatic telephone responding and recording systems are generally classified in either one of two groups. Systems of one group include a separate mechanism having an endless tape, magnetic reproducing head, and driving means for transmission of a message to the calling party and a second mechanism also including a magnetic tape, a magnetic recording head and driving means for recording the caller's message. Thus systems in this group utilize two independent sets of magnetic tape recording and reproducing systems. Devices of the second group while utilizing a single magnetic tape embody two recording tracks or channels with one being utilized for reproduction and transmission of a message to the caller and the other being used for recording a message from the caller. The first group of systems have not been found advantageous since they require a relatively large space for housing the recording and reproducing systems, and the structure is relatively complicated and expensive to manufacture. The second group has not been found advantageous since the number of messages to be reproduced and transmitted to callers must equal the number of possible calls that may be received. Accordingly, an equivalent number of control signals and metal elements carried by the tape must be provided which materially complicates the recording operation particularly when the device is employed by commercial users.

One object of the invention resides in the provision of a novel and improved cassette tape device which overcomes the disadvantages of prior known devices.

In accordance with the invention, a tape cassette is provided which includes a first magnetic recording tape carried by a pair of reels, an endless magnetic recording tape disposed above the first tape, a partition plate disposed between the two magnetic recording tapes, single driving means for driving both of the tapes simultaneously, a pair of magnetic recording and reproducing heads and a pair of erasing heads.

The above and other objects and advantages of the invention will become more apparent from the following description and accompanying drawings forming part of this application.

In the drawings.

In the drawings the same reference numerals are used to denote like components in each of the figures.

Figure 2:
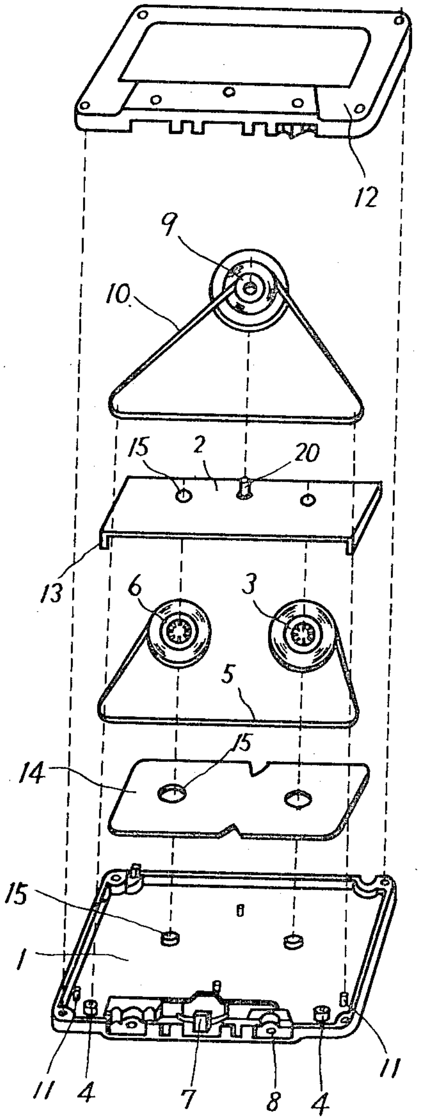
FIG. 2 is an exploded view of a cassette as illustrated in FIG. 1.
Figure 1:
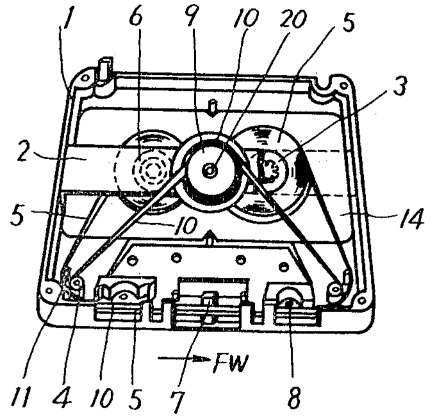
FIG. 1 is a perspective view of one embodiment of a cassette in accordance with the invention and with the cover removed.

Referring now to the drawings, the cassette in accordance with the invention includes a housing having a bottom portion 1 and a top portion 12. The bottom portion 1 carries a winding reel 3 and a feed reel 6, each having a thickness of approximately one-half the thickness of a conventional tape reel. The recording tape 5 which moves between the reels 3 and 6 also has a width approximately equal to one-half of the width of a conventional tape. A partition plate 2 of thin metal or synthetic resin is positioned over the reels 3 and 6 and carries a centrally disposed shaft 20. An endless tape reel 9 is rotatably carried on the shaft 20 and it in turn carries an endless magnetic recording tape 10 having a width approximately equal to one-half the width of conventional recording tapes. The recording tape 5 is arranged to engage guide pins 11 and guide rollers 4 while the magnetic tape 10 engages only the guide rollers 4. A recording and reproducing head pad 7 and a capstan station 8 are engaged by both tapes and the tapes are driven simultaneously in the direction of the arrow FW as observed in FIG. 3.

More specifically and with reference to FIG. 2, the bottom portion 1 of the housing includes a film 14 of tetrafluoroethylene in order to minimize electrostatic charges which may be produced by friction of the tape. The tape reels 3 and 6 are placed in engagement with shafts 15 and the tape 5 is threaded about guide pins 11 and guide rollers 4. The partition plate 2 is then placed over the reels 3 and 6 and in engagement with the shafts 15. The plate 2 has leg portions 13 at both ends to provide clearance between the plate and the reels 3 and 6. The endless tape reel 9 is then placed on shaft 20 which is carried by the partition plate 2 and the endless tape 10 is threaded about the guide rollers 4. The housing portion 12 of the cassette is preferably formed of a thin transparent synthetic resin material and is secured to the bottom portion 1 to complete the assembly of the cassette. The resultant tape cassette has the same geometry as a standard cassette used in commercially available cassette tape recorders but it includes two different types of tapes, namely, a reel to reel tape and an endless cape.

Figure 3:
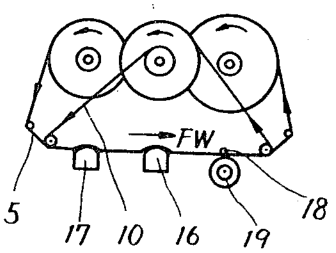
FIG. 3 is a plan view in diagrammatic form of the magnetic tapes used in the embodiment of the invention illustrated in FIGS. 1 and 2 and showing the tape paths and driving system.

In operation when the tape cassette in accordance with the invention is inserted in a standard cassette tape recorder, both tapes are automatically positioned in place and engage a recording and reproducing head station 16 and an erasing head 17 of the tape recorder. The tapes also pass between a capstan 18 and a pinch roller 19 as illustrated in FIG. 3. The capstan 18 and the pinch roller 19 are common to both tapes and are driven by the driving mechanism of the tape recorder.

While the recording and reproducing head stations generally used are of the two-track or two-channel type, four track or four channel heads may be used for increasing the recording time and for changing the message being transmitted to the caller by merely switching channels. Since the two tapes are driven simultaneously, when the cassette in accordance with the invention is used in an automatic telephone responding and recording device, the caller's message is recorded on the lower tape 5. If the repetition rate of the endless tape is approximately 1 minute, and a standard C-60 tape is used, about 30 conversations can be recorded on tape 5. The device may be controlled by a control signal previously recorded at the end portion of the endless tape or a sensing metal piece may be fixed to the tape portion. When it is desired to quickly wind or rewind the tape 5, means may be provided to drive that tape individually so that the endless tape 10 will not be driven. Moreover, the apparatus can be arranged so that the endless tape 10 can be driven by the capstan 18 and the pinch roller 19 only at the time of recording or reproduction.

While the foregoing description of the improved cassette tape in accordance with the invention has been made in connection with its use in automatic telephone responding and recording apparatus, this improved cassette can also be conveniently utilized in connection with the teaching of foreign languages. In such case, the endless tape 10 is made relatively short and is used for recording and reproducing a short conversation. In this way the recorded conversation can be repeatedly reproduced and the recording and reproducing operations can be controlled by merely operating a changeover switch and without the necessity for reversing the direction of rotation of the tape reels as in conventional tape recorders. The lower tape 5 may then be used for recording and reproducing a long conversation as in the case of conventional tape recorders.

While only one embodiment of the invention has been illustrated and described, it is apparent that alterations, modifications and changes may be made without departing from the true scope and spirit thereof as defined by the appended claims.

What is claimed is:

1. A cassette tape device comprising a housing, a magnetic tape within said housing, a pair of reels carrying said tape, an endless magnetic tape and reel within said housing, and means within said housing guiding said tapes in substantially coplanar parallel paths for cooperation with magnetic recording and reproducing heads, said tapes being adapted to be driven simultaneously and individually for recording and reproducing messages.

* * * * *